United States Patent [19]

Leyda

[11] Patent Number: 5,867,730
[45] Date of Patent: Feb. 2, 1999

[54] METHOD FOR CONFIGURATION OF PERIPHERALS BY INTERPRETING RESPONSE FROM PERIPHERALS TO ENABLE SELECTION OF DRIVER FILE AND ALTERING CONFIGURATION FILE TO ENABLE LOADING OF SELECTED DRIVER FILE

[75] Inventor: Jeff Leyda, Minneapolis, Minn.

[73] Assignee: Micron Eletronics, Inc., Nampa, Id.

[21] Appl. No.: 904,208

[22] Filed: Jul. 31, 1997

Related U.S. Application Data

[62] Division of Ser. No. 634,006, Apr. 15, 1996, Pat. No. 5,794,032.

[51] Int. Cl.$^6$ .............................. G06F 13/00; G06F 9/445
[52] U.S. Cl. ...................... 395/830; 395/652; 395/200.5; 395/681; 395/500
[58] Field of Search .................................... 395/652, 500, 395/828, 830, 200.5, 200.52, 200.51, 681

[56] References Cited

U.S. PATENT DOCUMENTS

| | | | |
|---|---|---|---|
| 4,589,063 | 5/1986 | Shah et al. | 364/200 |
| 5,128,995 | 7/1992 | Arnold et al. | 380/4 |
| 5,418,918 | 5/1995 | Vander Kamp et al. | 395/375 |
| 5,463,766 | 10/1995 | Schieve et al. | 395/650 |
| 5,581,766 | 12/1996 | Spurlock | 395/652 |
| 5,598,577 | 1/1997 | Overfield | 395/830 |
| 5,630,076 | 5/1997 | Saulpaugh et al. | 395/284 |
| 5,655,148 | 8/1997 | Richman et al. | 395/828 |
| 5,668,992 | 9/1997 | Hammer et al. | 395/651 |
| 5,675,831 | 10/1997 | Caputo | 395/830 |
| 5,701,476 | 12/1997 | Fenger | 395/652 |
| 5,732,282 | 3/1998 | Provino et al. | 395/830 |

*Primary Examiner*—Thomas C. Lee
*Assistant Examiner*—Rehana Perveen
*Attorney, Agent, or Firm*—Seed and Berry LLP

[57] ABSTRACT

A system for the automatic identification and configuration of a computer peripheral uses an initialization program to send one or more query instructions to a peripheral device such as a CD-ROM drive. In response to the query instructions, the CD-ROM drive replies with data that can be used to uniquely identify the model number or type of CD-ROM drive. The system then selects the appropriate software driver for the identified CD-ROM drive and loads the selected driver. The system can further verify proper operation of other peripheral devices, such as a hard disk drive, by using commands within the disk operating system. A floppy disk, or other computer readable storage media, contains the initialization program and a software driver file for every type of CD-ROM drive supported by the system. The system automatically identifies and loads the appropriate software driver without requiring the user to respond to technical questions related to the hardware.

16 Claims, 4 Drawing Sheets

METHOD FOR CONFIGURATION OF PERIPHERALS BY INTERPRETING RESPONSE FROM PERIPHERALS TO ENABLE SELECTION OF DRIVER FILE AND ALTERING CONFIGURATION FILE TO ENABLE LOADING OF SELECTED DRIVER FILE

CROSS-REFERENCE TO RELATED APPLICATION

This application is a division of U.S. patent application Ser. No. 08/634,006, filed Apr. 15, 1996 (now U.S. Pat. No. 5,794,032).

TECHNICAL FIELD

The present invention relates generally to a system and method for configuring computers, and more particularly, to a system and method for identifying and configuring computer data storage devices.

BACKGROUND OF THE INVENTION

The use of computers, especially personal computers (PCs) is widespread. The computing power of the PC, whether coupled to a network or operating as a stand-alone device, has increased significantly as new computer designs move into production. While the new computer designs have consistently increased computing power, it also increases the complexity of the programs that run the computer. To take advantage of the increased computing power, operating systems, such as Microsoft MSDOS® and Microsoft Windows® 95, have become more complex. As a result, the installation and setup of a new computer can be extremely complex, especially for individuals with little or no technical training. Similarly, the recovery from a computer "crash" may require the reinstallation or configuration of certain software components, which also requires a significant amount of technical expertise.

Some computer interface boards, known as "plug and play" boards, have the ability to be identified and configured by the operating system. These boards contain extensive additional circuitry beyond that required to control the peripheral device. However, the identification of the boards is performed by the operating system. If the operating system is malfunctioning, the identification of boards cannot proceed.

Therefore, it can be appreciated that there is a significant need for a system and method to aid in the installation and/or reinstallation of computer software in a simplified and automated manner. The present invention provides this and other advantages as will be apparent from the following detailed description and accompanying figures.

SUMMARY OF THE INVENTION

The present invention is embodied in a system and method for the automatic identification and configuration of computer hardware peripherals. In one embodiment, the system permits the automatic identification and configuration of a peripheral device, such as a compact disk read-only memory (CD-ROM) drive. The system includes a plurality of software driver files for operation of a plurality of different peripheral device types. An initialization program executes a query instruction, which includes an identification request to the peripheral device. A response from the peripheral device includes identification data for the peripheral device. The response, including the identification data, is interpreted to permit the selection of one of the plurality of driver files corresponding to the identified peripheral device type. A driver loader then loads the selected driver file.

In one embodiment, the peripheral device is a CD-ROM drive having an integrated device electronics (IDE) device, and the query instruction includes an attention application programming interface (ATAPI) identify device instruction to the IDE CD-ROM drive. Alternatively, the CD-ROM drive may include a small computer system interface (SCSI) device, and the query instruction includes an SCSI device instruction to the SCSI interface coupled to the CD-ROM drive.

The system may also include a bootable floppy disk containing the plurality of driver files. The bootable floppy disk may also contain the initialization program as an executable file.

The system also permits the configuration of a hard disk drive by executing an additional query instruction that checks the hard disk drive for partitions and proper formatting. If the hard disk drive does not contain the proper partitions and formatting, the system can automatically execute instructions to partition and format the hard disk drive. The additional query instruction to the hard disk drive may be executed following the loading of the selected driver file corresponding to the CD-ROM drive.

DETAILED DESCRIPTION OF THE INVENTION

Figure 1:
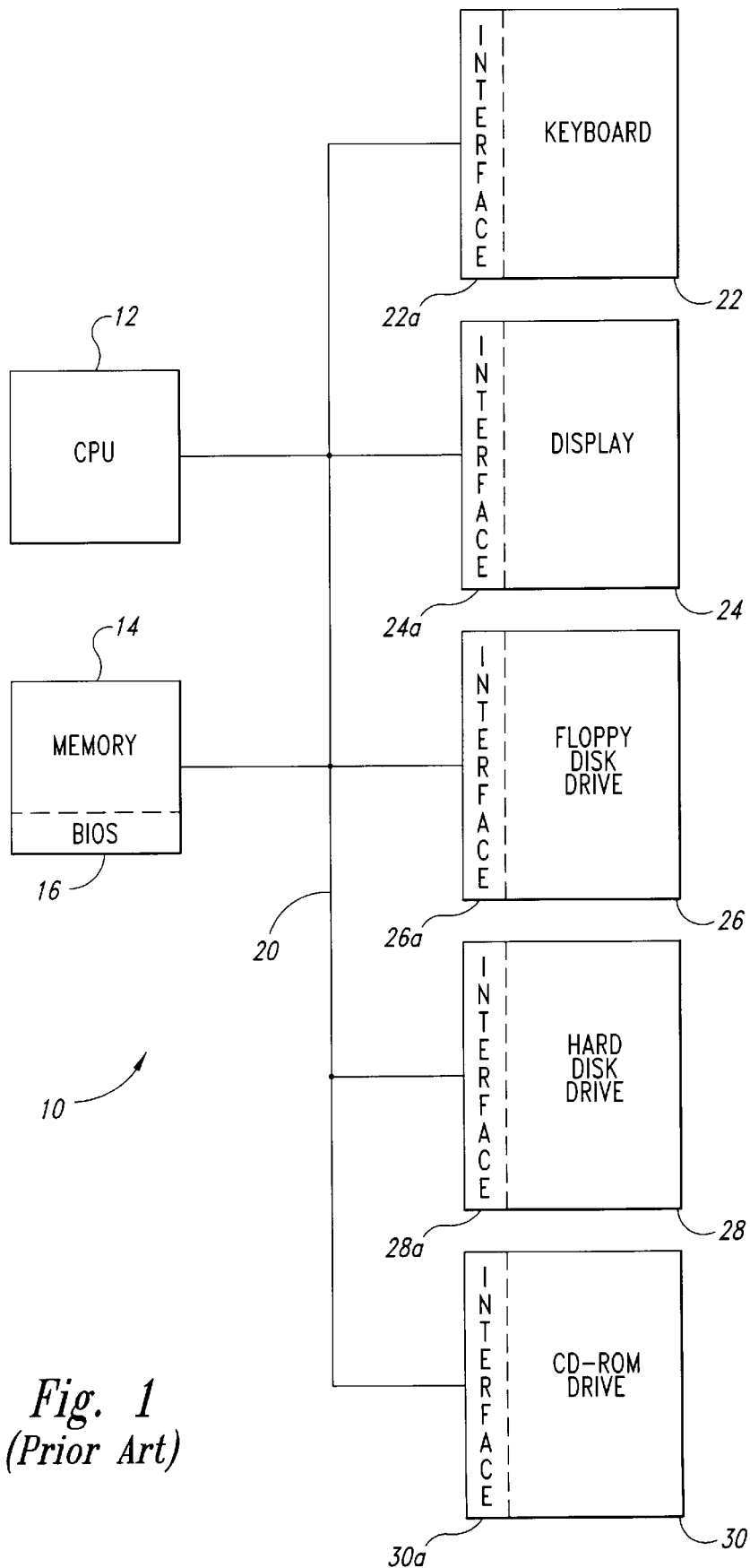
FIG. 1 is a functional block diagram of a conventional computer system.

A typical personal computer (PC) contains many different components. The user must typically be familiar with the hardware components, the associated interfaces, and the software drivers used to operate the hardware interfaces in order to properly install and maintain the PC. A conventional computer 10 is illustrated in the functional block diagram of FIG. 1. The computer 10 includes a central processing unit (CPU) 12, such as an Intel Pentium® microprocessor. The computer 10 also includes a memory 14, which may include both random access memory (RAM) and read only memory (ROM). The ROM portion of the memory 14 is typically used by the computer 10 when power is first applied to the computer or if the computer is reset. The ROM portion of the memory 14 includes a basic input/output system (BIOS) 16, which contains a set of instructions that initialize the CPU 12, and other components in the computer 10. The various components in the computer 10 are coupled together by a bus system 20, which may carry power and control signals in addition to data. The bus system 20 may consist of a single bus or several busses interconnected by bus bridges. However, for the sake of brevity and clarity, the bus system 20 is represented in FIG. 1 by a single bus. Also, for the sake of simplicity, other conventional components such as the power supply, mouse and the like are not shown in FIG. 1.

The computer also includes a keyboard 22, keyboard interface 22a, display 24, such as a video display, flat screen display, or the like, and a display interface 24a. The computer 10 also includes a floppy disk drive 26, a hard disk drive 28, and a CD-ROM drive 30, as well as a floppy disk drive interface 26a, hard disk drive interface 28a, and CD-ROM drive interface 30a, respectively. It should be understood that some peripheral devices can share a common interface board. For example, the floppy disk drive 26 and the hard disk drive 28 are often controlled by a single interface instead of the separate floppy disk drive interface 26a and hard disk drive interface 28a illustrated in FIG. 1.

When the computer 10 is powered up or reset, instructions in the BIOS 16 are executed by the CPU 12. The BIOS 16 contains instructions for the CPU 12 to perform basic functions such as setting internal registers (not shown) in the CPU to predetermined values. The BIOS 16 also causes the CPU to perform basic operations for peripheral devices, such as the keyboard 22 and the display 24, by setting registers (not shown) in the keyboard interface 22a and display interface 24a to predetermined values. The BIOS 16 typically includes instructions for setting registers (not shown) in the floppy disk drive interface 26a and hard disk drive interface 28a to permit proper operation of the floppy disk drive 26 and hard disk drive 28.

The BIOS 16 provides instructions for basic I/O operations. Once the CPU 12 has completed execution of the BIOS instructions, the computer 10 can start the operating system, such as Microsoft MSDOS®. The typical computer 10 checks the floppy disk drive 26 for a bootable operating system. A bootable operating system is one that contains all the necessary files to start the operating system. For example, MSDOS includes three files called "IO.SYS," "MSDOS.SYS," and "COMMAND.COM." Instructions within the BIOS 16 transfer control of the computer 10 to the file IO.SYS, which further initializes the computer 10 in a well known fashion. The IO.SYS file completes its initialization and loads the file MSDOS.SYS. The file MSDOS.SYS also functions in a well known manner and is responsible for loading the COMMAND.COM file, which is a user interface for the MSDOS.SYS file. The operation of these files are well known to those of ordinary skill in the art, and need not be discussed in detail. Operating systems, other than MSDOS, have similar data files and characteristics.

In addition to loading the COMMAND.COM file, the IO.SYS file instructs the CPU 12 to load a data file called "CONFIG.SYS" to configure hardware and software components of the computer 10 for proper operation. For example, the memory 14 can be configured to reserve space for certain application programs or I/O devices. The number of I/O channels and buffers sizes are also selected. These configuration parameters are well known to those of ordinary skill in the art and need not be described in detail herein.

Of particular importance to the present invention is the configuration of certain I/O devices, such as the CD-ROM drive 30. The CPU 12 sequentially executes the lines of code in the CONFIG.SYS file to load the software drivers for the CD-ROM drive 30 into the memory 14. An example of a typical CONFIG.SYS file is illustrated below in Table 1.

TABLE 1 device=c:\soundfx\sscd.sys /b:330
device=c:\soundfx\cdmke.sys /d:sscd_000 /p:338 /v
lastdrive=e
device=c:\dos\himem.sys
device=c:\dos\emm386.exe ram i=e800-efff x=c901

Figure 2:
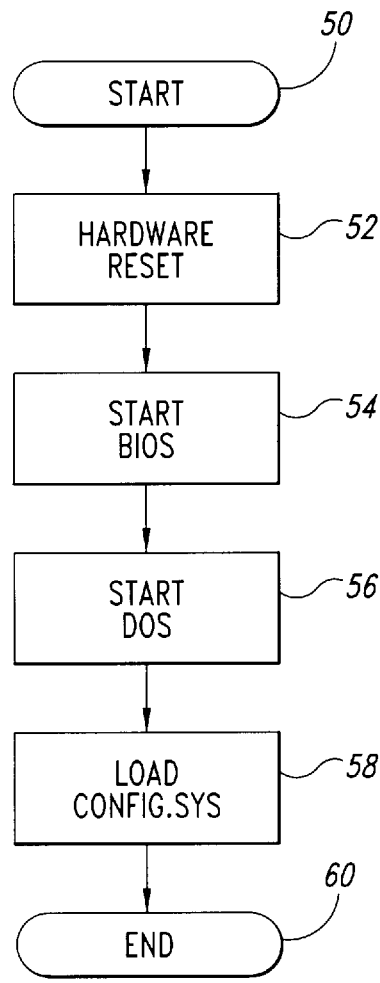
FIG. 2 is a flowchart of the start-up procedures used by the conventional computer of FIG. 1.

TABLE 1-continued buffers=10
files = 100
stacks=9,256
dos=high,umb
devicehigh=c:\dos\setver.exe
device=c:\turbocom.sys FIG. 2 is a flowchart used by the computer 10 to start up the computer in the proper configuration. At a start 50, it is assumed that the computer 10 has just been turned ON or that the user has manually depressed a reset button (not shown). In either case, the computer 10 generates a hardware reset in step 52. In response to the hardware reset, the CPU 12 starts BIOS in step 54 by beginning the execution of instructions in the BIOS 16. Following completion of the BIOS instructions, the computer starts the disk operating system (DOS) in step 56. While the previous discussion has used Microsoft MS-DOS as an example, those of ordinary skill in the art can appreciate that other operating systems have similar start-up procedures.

In step 58, the computer 10 loads the CONFIG.SYS data file in step 58. As previously discussed, the CONFIG.SYS data file instructs the CPU 12 to load software drivers for the various peripheral devices and configures the interfaces associated with the peripherals. The computer 10 ends the start-up process at an end 60 with the DOS now running on the computer.

If any of the software programs used to initialize the computer 10 are corrupted in any manner, the CPU 12 will be unable to execute instructions to properly configure the computer and start the DOS. For example, if the start-up program, such as IO.SYS, is corrupted, or the CONFIG.SYS data file is corrupted, the DOS will not function. Corruption of data files may be caused by the improper installation of computer hardware and its associated software, or the improper installation of an application software program. Corruption may also be caused by electrical transients, accidental erasure of data files, a computer virus, an actual hardware failure or the like. No matter what has caused the corruption of these critical data files, the computer 10 will not operate properly until the user corrects the problem. This is true even with plug and play boards, which are identified by the operating system, because the operating system cannot be started without the proper configuration of the computer 10. Similarly, operating systems such as Windows® 95 may have the ability to identify peripheral devices, such as the CD-ROM drive 30. However, the Windows 95 operating system cannot be started if there is an error in one of the required startup data files, such as CONFIG.SYS. Thus, the identification and configuration of interfaces cannot occur until the source of the error is determined and the corrupted file repaired or replaced. Unfortunately, the user often does not know the source of the problem. Furthermore, the typical user is unfamiliar with the computer hardware and software and is ill-prepared to load the proper drivers and to properly configure the computer 10.

The present invention is directed to a system and method that automatically identifies certain peripheral components and selects the correct software drivers for those identified components. Specifically, the present invention can identify the particular type of CD-ROM drive 30 installed in the computer 10. Following the identification, the present invention can select and load the appropriate software driver to properly configure the CD-ROM interface 30a to operate the CD-ROM drive. Similarly, the present invention can analyze the hard disk drive 28 and prepare the hard disk drive to receive data. The present invention is significantly different from other interface identification techniques, such as plug and play interface boards. Plug and play techniques are directed to the configuration of the hardware interface or controller for a peripheral device, rather than the software drivers that operate the peripheral device. For example, the CD-ROM drive interface 30a may be a plug and play type device. The plug and play techniques may be used to identify and configure the CD-ROM drive interface 30a, with parameters such as I/O address, interrupt request line, direct memory access (DMA) request line, and the like. However, the CD-ROM drive 30 itself is not a plug and play device. The CD-ROM drive 30 requires the hardware control provided by the CD-ROM drive interface 30a and a software driver that operates the CD-ROM drive. The present invention is directed to a bootable system that identifies and loads the required software drivers.

Figure 3:
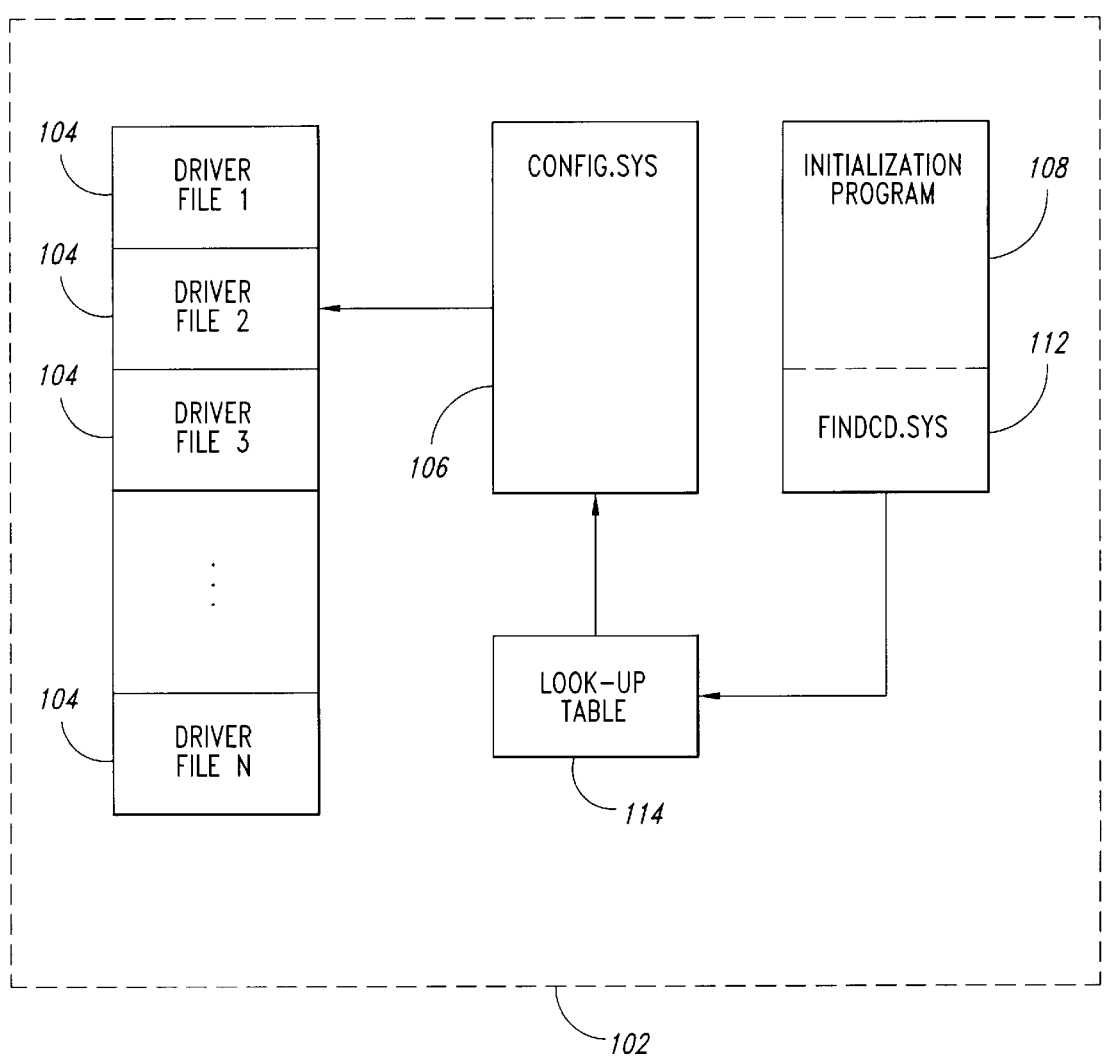
FIG. 3 is a functional block diagram of the system of the present invention.

The present invention is embodied in a system 100, illustrated in the functional block diagram of FIG. 3. It should be noted that the system 100 comprises a series of software data files that are typically stored on a computer readable media, such as a floppy disk, illustrated in FIG. 3 by the dashed line and a reference numeral 102. The floppy disk 102 containing the system 100 can be used on any computer, such as the computer 10 (see FIG. 1). The user can insert the floppy disk 102 into the floppy disk drive 26 if the computer 10 does not function properly due to corrupted data files. The system 100 includes a plurality of software driver files 104. It should be noted that the term "software drivers" refer to a computer program used to operate an interface while the term "software driver file" refers to a physical data file stored on the floppy disk 102. Each of the software driver files 104 is intended for use with a specific type of CD-ROM drive 30. For example, a particular manufacturer may make three different models of CD-ROM drive. Thus, the system 100 would include a software driver file 104 for each of the three models of the CD-ROM drive 30 manufactured by that manufacturer. It should be noted that some software drivers can be used for more than one type of CD-ROM drive. In this situation, the system 100 need only store one copy of the software driver file 104 rather than a duplicate copy of the same software driver file for each of the CD-ROM drives 30 that use the same software driver.

The system 100 determines the identity of the particular CD-ROM drive 30 and loads the corresponding software driver from the plurality of software driver files 104. This is in contrast to the conventional computer 10 (see FIG. 1) in which the user must identify the particular type of CD-ROM drive, locate the software driver file developed for that particular CD-ROM drive, and load the particular software driver file. When the conventional computer 10 is first powered up, or reset, the CONFIG.SYS file provides the file name of the correct software driver file for the particular CD-ROM drive 30 and sets other parameters, such as buffer size, interrupt request line, and the like. However, the system 100 includes software driver files 104 for all known types of CD-ROM drives 30 or all types of CD-ROM drives supported by the computer manufacturer. When the computer 10 is first powered up, or reset, the system 100 automatically identifies the particular type of CD-ROM drive 30 and loads the appropriate software driver file. Thus, the system 100 may be thought of having a specialized CONFIG.SYS file 106 that contains lines of code to load all the software driver files 104. The system 100 automatically identifies the CD-ROM drive 30 and modifies the specialized CONFIG.SYS file 106 to load only the appropriate software driver file from the floppy disk 102 without the need for the user to identify a particular type of CD-ROM drive 30. Similar procedures can be used with other peripheral devices. This is especially advantageous for less experienced users who may have difficulty identifying the particular model of the CD-ROM drive 30, or may have forgotten the relevant information if the installation was completed some time ago.

The system 100 includes an initialization program 108, which begins execution following the execution of the instructions in the BIOS 16 (see FIG. 1). Thus, the initialization program 108 is a bootable program. The user operates the system 100 by simply inserting the floppy disk 102 in the floppy disk drive 26 and resetting the computer 10. The initialization program 108 contains one or more query instructions directed to the CD-ROM drive 30. The query instructions are generically labeled as a "FINDCD.SYS" instruction 112. The initialization program 108, including the FINDCD.SYS instruction 112, are automatically executed by the CPU 12 (see FIG. 1).

In a preferred embodiment, the CD-ROM drive interface 30a is an "integrated drive electronics" (IDE) interface. As is well known to those of ordinary skill in the art, the IDE type CD-ROM drive interface 30a can be used with a variety of different CD-ROM drives 30 because electrical circuitry (not shown) that is unique to the particular model of CD-ROM drive 30 is integrated into the CD-ROM drive itself. The FINDCD.SYS instruction 112 is designed to determine the type of CD-ROM drive 30 coupled to the IDE CD-ROM drive interface 30a. With the IDE type CD-ROM drive interface 30a, the FINDCD.SYS instruction 108 is an "Attention Application Programming Interface" (ATAPI) device identification instruction. The ATAPI device ID instruction is transmitted via the IDE type CD-ROM drive interface 30a to the CD-ROM drive 30. In response, the CD-ROM drive 30 returns a sequence of data bytes, including a vendor identification and model number for the CD-ROM drive 30. A typical response from the CD-ROM drive 30 to the receipt of an ATAPI device ID instruction is illustrated below in Table 2.

TABLE 2

DATA FORMAT:

| Word | Bit 7/15 | Bit 6/14 | Bit 5/13 | Bit 4/12 | Bit 3/11 | Bit 2/10 | Bit 1/9 | Bit 0/8 |
|---|---|---|---|---|---|---|---|---|
| 0 | mvl = 1 | CMD PKT DRQ = 01b | | 0 | 0 | 0 | P Size = 00b | |
| | | Protocol = 10b | | | Device Type = 000101b | | | |
| 1 . . . 9 | | | | Not used or reserved = all zero | | | | |
| 10 . . . 19 | | | | Serial Number = all zero (Not supported) | | | | |
| 20 | | | | Buffer Typer = 0000h (Not supported) | | | | |
| 21 | | | Transfer Size = 0080h (128KBytes) {FX001DEFXN01DE} = 0100h (256KBytes) {FX002DEFXN02DE} | | | | | |

TABLE 2-continued

DATA FORMAT:

| Word | Bit 7/15 | Bit 6/14 | Bit 5/13 | Bit 4/12 | Bit 3/11 | Bit 2/10 | Bit 1/9 | Bit 0/8 |
|---|---|---|---|---|---|---|---|---|
| 22 | | | | Not used = 0000h | | | | |
| 23 . . . 26 | | | | Firmware Version = E??? | | | | |
| 27 . . . 46 | | | Model Number = 'FX001DE' = 'FXN01DE' = 'FX002DE' = 'FXN02DE' | | | | | |
| 47 | | | | Not used = 000h | | | | |
| 48 | | | | Double Word I/O = 0000h (Not supported) | | | | |
| 49 | | | | Vendor Unique = 00h | | | | |
|  | 0 | 0 | 0 | 0 | IORDY = 0 | PRG = 0 | LBA = 10 | DMA = 0 |
| 50 | | | | Reserved = 0000h | | | | |
| 51 | | | PIO Cycle Timing = 0000h (Mode 0) {FX001DE} = 0200h (Mode 2) {FX002DE} | | | | | |
| 52 | | | | DMA Cycle Timing = 0000h (Not supported) | | | | |
| 53 . . . 61 | | | | Not used = all zero | | | | |
| 62 | | | | Singleword DMA Mode = 0000h (Not supported) | | | | |
| 63 | | | | Multiword DMA Mode = 0000h (Not supported) | | | | |
| 64 | | | | Enhanced PIO Mode (Mode 3) = 0000h (Not supported) | | | | |
| 65 | | | | Blind PIO minimum cycle time = 0000h (Not supported) | | | | |
| 66 | | | | Recommended Multiword DMA Cycle Time = 0000h (Not supported) | | | | |
| 67 | | Minimum PIO Cycle Time without Flow Control = 024Dh (589ns) {FX001DE} = 00EAh (234ns) {FX002DE} | | | | | | |
| 68 | | | | Minimum PIO Cycle Time with IORDY = 0000h | | | | |
| 69 . . . 255 | | | | Reserved = all zero | | | | |

The response from the CD-ROM drive provides the necessary data to uniquely identify the particular CD-ROM drive 30. The initialization program 108 causes the CPU 12 to read the data and determine therefrom the model number of the particular CD-ROM drive 30.

The software driver files 104 are each associated with a particular CD-ROM drive 30. With the unique identification of the CD-ROM drive 30, the system 100 uses a look-up table 114 to identify the filename of the appropriate software driver file 104. The look-up table 114 contains a list of possible types of the CD-ROM drive 30 as inputs and outputs the name of the software driver file 104 corresponding to the identified CD-ROM drive type. The system 100 automatically selects the appropriate software driver from the software driver files 104 and loads the selected software driver into the appropriate location in the memory 14 (see FIG. 1).

An example of the specialized CONFIG.SYS file 106 is illustrated below in Table 3.

TABLE 3

```
[common]
set cdrom=none__yet
device=himem.sys/testmem:off
device=\cdrom\find-cd.sys
dos=high,umb
files=60
buffers=30
stacks=9,256
lastdrive=e:

;[menu]
;menuitem=mitsumi, Mitsumi 2x/4x
;menuitem=sanyo, Sanyo 4x
;menuitem=aspi4dos,NEC or Plextor CD W/adaptec 1542b/cf
;menuitem=aspi2dos,NEC or Plextor CD W/adaptec 6360/6260 chip
;menuitem=aspi8dos,NEC or Plextor CD W/adaptec 2940
;menuitem=amd,NEC or Plextor CD W/AMD scsi or scsi/lan chip
;menuitem=buslogic,NEC or Plextor CD W/Bus Logic PCI controller
;menuitem=hitachi,Hitachi IDE CDROM
;menuitem=sony,Sony IDE CD-ROM
;menuitem=teac,Teac IDE CD-ROM
;menuitem=flashpt,NEC or Plextor CD W/Bus Logic Flashpoint controller
;menuitem=future,NEC or Plextor CD W/Future Domain TMC-1610 controller ;[mitsumi]
Device=cdrom\mtmcdai.sys/d:mtmide01
;set cdrom=mtmide01

;[aspi4dos]
device=cdrom\aspi4dos.sys/d
device=cdrom\aspi4cd.sys/d:aspi4cd0
;set cdrom=aspi4cd0

;[aspi2dos]
device=cdrom\aspi2dos.sys/z/d
device=cdrom\aspi2cd.sys/d:aspi2cd0
```

TABLE 3-continued

```
;set cdrom=aspi2cd0

;[aspi8dos]
device=cdrom\aspi8dos.sys/d
device=cdrom\aspi8cd.sys /d:aspi8cd0
;set cdrom=aspi8cd0

;[amd]
device=cdrom\amsida.sys
device=cdrom\cdromsys.sys /d:amdaspi
;set cdrom=amdaspi ;[buslogic]
device=cdrom\btdosm.sys/d
device=cdrom\aspiblcd.sys /d:busaspi
;set cdrom=busaspi ;[hitachi]
device=cdrom\hit_ide.sys /d:mscd001
;set cdrom=mscd001

;[sony]
device=cdrom\atapi_cd.sys /d:sony_cd0
;set cdrom=sony_cd0

;[sanyo]
device=cdrom\sjcdapi.sys /d:sanyocd0
;set cdrom=sanyocd0

;[teac]
device=cdrom\teac_cdi.sys /d:teac_cd0
;set cdrom=teac_cd0

;[flashpt]
device=cdrom\flashpt.sys /d
device=cdrom\btcdrom.sys /d:busflpt
;set cdrom=busflpt ;[future]
device=cdrom\fdcd.sys /d:fdcd01
;set cdrom=fdcd01

;[common]
;set endflag=1
;rem flag to denote the end of the config.sys file
```

The specialized CONFIG.SYS file 106 on the floppy disk 102 initially contains program lines to load all of the software driver files 104. The lines of code that configure the computer 10 (see FIG. 1) such as "files," "buffers," "stack," and the like are necessary for proper operation of the computer. However, only the lines of code that load the software driver file 104 (see FIG. 3) for the identified CD-ROM drive 30 are required for proper operation of the CD-ROM drive. The lines of code that refer to software driver files 104 for all other types of CD-ROM drives are unnecessary. The system 100 removes the unnecessary lines of code from the specialized CONFIG.SYS file 106 before they are executed by the CPU 12 (see FIG. 1). In a presently preferred embodiment, the system 100 effectively removes the unnecessary lines of code from the specialized CONFIG.SYS 106 by placing a remark (Rem) command at the start of each unnecessary line of code. The CPU 12 will not execute any lines of code that begin with an "rem." Thus, the system 100 automatically and uniquely identifies the CD-ROM drive 30 and selects the appropriate software driver file corresponding to the particular CD-ROM drive. The system 100 can be periodically updated to include new revisions of the software drivers and to add additional software drivers to the software driver files 104. This can be readily accomplished by replacing old versions of the software driver files 104 on the floppy disk 102 or adding new software driver files to the floppy disk and updating the specialized CONFIG.SYS file 106. Thus, the system 100 can be readily updated to include previously unknown types of CD-ROM drives 30.

In an alternative embodiment, the CD-ROM drive 30 is coupled to a small computer system interface (SCSI) 30*a*. As described above, the IDE type CD-ROM drive interface 30*a* uses a single common design to operate with a variety of different CD-ROM drives 30 using the appropriate software driver for that particular CD-ROM drive. In contrast, the SCSI type CD-ROM drive interface 30*a* is unique to each manufacturer, but typically uses a generic software driver file for all CD-ROM drives 30 for that manufacturer. Therefore, the system 100 must identify the model number of SCSI type CD-ROM drive interface 30*a* rather than the model number of the CD-ROM drive 30 itself.

The SCSI type CD-ROM drive interface 30 does not respond to the ATAPI identification instruction, as does the IDE type CD-ROM drive interface 30*a*. Therefore, the query instruction in the FINDCD.SYS instructions 112 for the SCSI type CD-ROM drive interface 30*a* comprises one or more instructions unique to each manufacturer of the SCSI type CD-ROM drive interface. The query instructions to the SCSI type CD-ROM drive interface 30 are unique to each manufacturer, and thus will not be discussed in greater detail herein. However, each model of SCSI type CD-ROM drive interface 30a will only respond appropriately to query instructions that are unique to that model, thus allowing the system 100 to uniquely identify the model number of the SCSI type CD-ROM drive interface. Once the system 100 has determined the model number of SCSI type CD-ROM drive interface 30a, the generic driver for that particular model of SCSI type CD-ROM drive interface is selected from the software driver files 104 and loaded into the appropriate location in the memory 14 (see FIG. 1). Thus, the system 100 determines the model number of the CD-ROM drive 30 coupled to the IDE type CD-ROM drive interface 30a, or the model number of the SCSI type CD-ROM drive interface 30a, and automatically loads the appropriate software driver. This is particularly advantageous for a user who has little or no technical knowledge about the computer 10.

Figure 4:
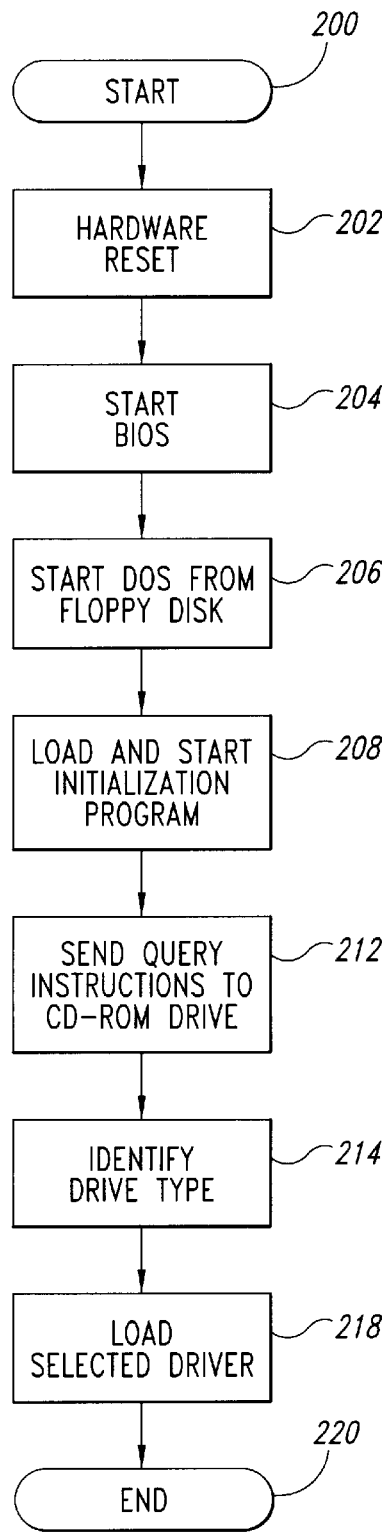
FIG. 4 is a flowchart detailing the operation of the system of FIG. 3.

The operation of the system 100 is illustrated in the flowchart of FIG. 4 where at a start 200 the computer 10 (see FIG. 1) has just been powered up or reset. In step 202, the computer 10 performs a hardware reset operation. In step 204, the computer 10 starts executing instructions from the BIOS 16. In step 206, the computer starts the DOS from the floppy disk 102 (see FIG. 3). As previously discussed, the computer 10 can be booted from the floppy disk 102. The system 100 begins execution of the initialization program 108 (see FIG. 3) in step 208. In step 212, the system 100 sends one or more query instructions to the CD-ROM drive 30 and the CD-ROM drive interface 30a. As discussed above, the query instruction may be an ATAPI instruction or query instructions unique to the particular manufacturer of the SCSI type CD-ROM drive interface 30a. In either event, a response from the CD-ROM drive 30 or CD-ROM drive interface 30a is used to identify the particular model number in step 214. In step 218, the system 100 modifies the specialized CONFIG.SYS file 106 to remove the unnecessary lines of code so that the computer 10 selects and loads the appropriate software driver from the software driver files 104 on the floppy disk 102. The system 100 ends at step 220 with the CD-ROM drive 30 having been configured and ready for operation. With a functioning CD-ROM drive 30, the user can readily reload any corrupted software data files or application software programs.

The system 100 is also capable of verifying proper operation of the hard disk drive 28 (see FIG. 1). In normal operation, the hard disk drive 28 is formatted and has at least one data partition. The use of partitions on the hard disk drive 28 are well known to those of ordinary skill in the art, and need not be described in detail herein. The system 100 automatically verifies the proper formatting and partitioning of the hard disk drive 28. If the hard disk drive is not properly formatted or partitioned, the system can automatically perform these functions.

In this aspect of the invention, the initialization program 108 on the floppy disk 102 also includes a series of DOS commands to check the partition and the formatting of the hard disk drive 28. If the hard disk drive 28 is not properly formatted and partitioned, the floppy disk 102 contains DOS commands, such as "FORMAT" that can be used to format and partition the hard disk drive 28. Other conventional DOS commands can be used by the system 100 to verify proper operation of the hard disk drive 28. As those skilled in the art can readily appreciate, the system 100 cannot perform these functions if the hard disk drive 28 has sustained actual damage and is non-functional. However, if the hard disk drive 28 is operational, but is not functioning due to corrupted formatting, partitioning, or the presence of other corrupted files, the system 100 can be used to automatically reformat and partition the hard disk drive.

The advantage of the system 100 is its ability to automatically identify and configure devices such as the CD-ROM drive 30 without the need for technical expertise on the part of the user. Although the system 100 has been described as being loaded on the floppy disk 102, the present invention is not limited to this embodiment. For example, the initialization program 108 and FINDCD.SYS instructions 112 could be part of the BIOS 16 (see FIG. 1). Similarly, the software driver files 104 could be part of the BIOS 16 as well. However, the installation of the software driver files 104 on a computer readable media such as the floppy disk 102 simplifies the process of revising and updating the software driver files 104.

It is to be understood that even though various embodiments and advantages of the present invention have been set forth in the foregoing description, the above disclosure is illustrative only, changes may be made in detail, yet remain within the broad principles of the invention. Therefore, the present invention is to be limited only by the appended claims.

I claim:

1. A method for the automatic identification and configuration of a peripheral device included in a computer system using a plurality of driver files for operation of a plurality of different types of the peripheral device, the method comprising:

loading a configuration file into a computer memory, the configuration file containing computer commands to load the plurality of driver files;

executing a query instruction, including an identification request to the peripheral device;

interpreting a response from the peripheral device to enable the selection of one of the plurality of driver files;

altering the configuration file to enable the loading of said selected driver file; and loading said selected driver file.

2. The method of claim 1 for use with an initialization program stored on a bootable floppy disk and said act of executing said query instruction is executed as part of said initialization program.

3. The method of claim 2 wherein said plurality of driver files are stored as files on said bootable floppy disk and said step of loading said selected driver file includes loading said selected file from said floppy disk.

4. The method of claim 1 wherein the peripheral device is a compact disk read-only memory (CD-ROM) drive.

5. The method of claim 4 wherein said CD-ROM drive is an integrated device electronics (IDE) device and said query instruction comprises an attention application programming interface (ATAPI) identify device instruction to said CD-ROM drive.

6. The method of claim 4 wherein said CD-ROM drive is a small computer system interface (SCSI) device and said query instruction comprises one or more SCSI instructions to a SCSI interface coupled to said CD-ROM drive.

7. The method of claim 6 wherein said selected driver file corresponds to said identified SCSI interface.

8. The method of claim 6 for use with a hard disk drive, the method further including the step of executing an additional query instruction, said additional query instruction including an operation verification instruction to the hard disk drive.

9. The method of claim 8 wherein said additional query instruction is executed following said step of loading said selected driver file corresponding to said CD-ROM drive.

10. The method of claim 5 for use with a hard disk drive, the method further including the step of executing an additional query instruction, said additional query instruction including an operation verification instruction to the hard disk drive.

11. The system of claim 10 wherein said additional query instruction is executed following said step of loading said selected driver file corresponding to said CD-ROM drive.

12. A method for the automatic identification and configuration of a peripheral device included in a computer system using a plurality of driver files for operation of a plurality of different types of the peripheral device, the method comprising the steps of:

loading a configuration file into a computer memory, the configuration file containing computer commands to load the plurality of driver files;

executing a query instruction, including an identification request to the peripheral device;

interpreting a response from the peripheral device, said response including identification data for the peripheral device to enable the selection of one of the plurality of driver files;

altering the configuration file based on said identification data to disable the loading of all of said plurality of driver files except said selected driver file; and loading said selected driver file corresponding to the peripheral device.

13. The method of claim 12 wherein the peripheral device is a compact disk read-only memory (CD-ROM) drive.

14. The method of claim 13 wherein said CD-ROM drive is an integrated device electronics (IDE) device and said step of executing said query instruction includes executing an attention application programming interface (ATAPI) identify device instruction to said CD-ROM drive.

15. The method of claim 13 wherein said CD-ROM drive is a small computer system interface (SCSI) device and said query instruction includes one or more SCSI instructions to a SCSI interface coupled to said CD-ROM drive.

16. The method of claim 12 for use with a hard disk drive, the method further including the step of executing an additional query instruction, said additional query instruction including an operation verification instruction to the hard disk drive.

* * * * *